Patented Aug. 22, 1950

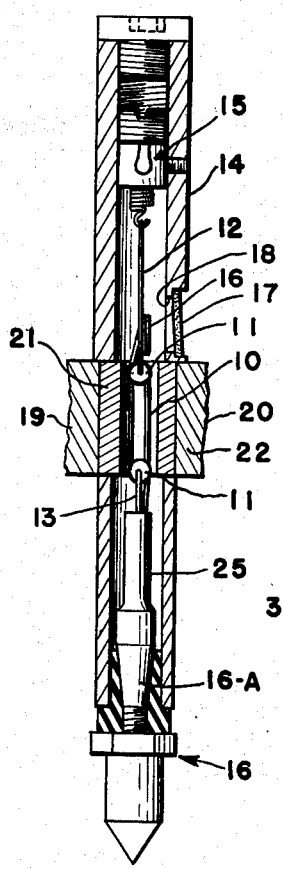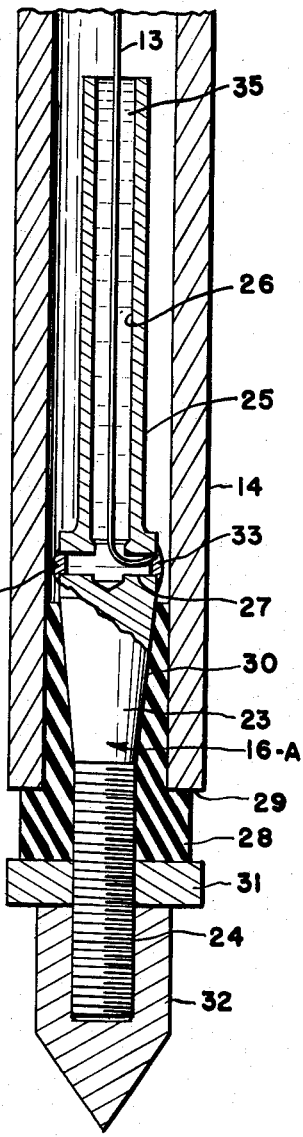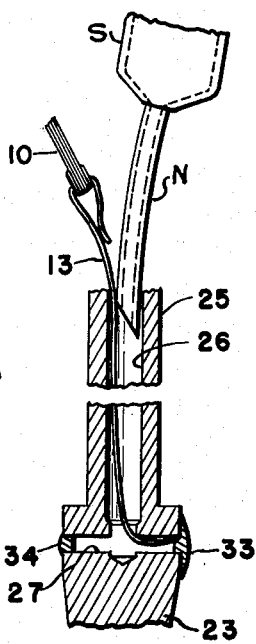

2,519,689

UNITED STATES PATENT OFFICE 2,519,689

GALVANOMETER

Marvin E. Morrow, Tulsa, Okla., assignor to Century Geophysical Corporation, a corporation of Delaware Application October 27, 1947, Serial No. 782,303

9 Claims. (Cl. 171—95)

This invention relates to improvements in oscillograph galvanometers, such as are used in seismograph oscillograph cameras and the like, in which as many as 25 or more separate D'Arsonval-type galvanometers are required to record the out-puts of as many channels of amplifier on a single moving sheet of photographically sensitive paper or film.

In a former application Serial No. 611,647, filed August 20, 1945, now Patent No. 2,439,576, I have described an improved form of such a galvanometer and the present invention is directed to further improvements in that type of galvanometer. In the type of galvanometer there described, the structure comprises a vibratory assembly of generally conventional construction suspended in a tubular barrel which is adapted to be vertically inserted between the pole pieces of a magnet, between which the galvanometer coil is positioned.

Such galvanometers normally require some means for damping their oscillations and in conventional practice the tube or barrel containing the galvanometer suspension is normally filled with some form of damping liquid. Complete filling of the tube with a damping liquid, however, has certain undesirable characteristics. For example, the mirror, which is normally carried by the galvanometer suspension to reflect its oscillation, is also immersed in the damping liquid and its reflection characteristics may be undesirably affected by the damping liquid.

Prior galvanometer structures have attempted to overcome the difficulties arising from complete immersion by enclosing a part of the lower suspension filament of the galvanometer in a tubular sleeve of capillary dimensions in which is introduced a quantity of damping liquid. In such structures the damping tube is normally fastened rigidly to the wall of the galvanometer barrel, with the result that completion of the galvanometer assembly and its adjustment must be made after installation in the barrel, which creates problems in accuracy of adjustment and matching of multiple units, as pointed out in my previous application. In the second place, with a damping tube of this type, which is necessarily open at both ends in order to allow the galvanometer suspension to be threaded therethrough, the capillary attraction, which is relied upon for retaining the damping liquid in the damping tube, has proven ineffective because of the fact that the vibration of the galvanometer and of the entire structure, when used under field conditions, will cause some of the damping liquid to be shaken out of the damping tube thus limiting or destroying the damping effect sought.

The present invention has as its principal object the provision of a structure which obviates the aforementioned difficulties by providing a novel form of liquid damping element as a part of the galvanometer suspension assembly which permits the entire assembly to be installed in the galvanometer barrel as a unit.

Another important object is the provision of an improved galvanometer structure having an anchoring element for the galvanometer assembly, which combines the functions of anchoring and of liquid damping of the galvanometer.

Other and more specific objects and advantages will be apparent from the following detailed description when read in conjunction with the accompanying drawings which illustrate an embodiment in accordance with this invention.

In the drawings:

Fig. 1 is a longitudinal sectional view of a galvanometer in accordance with this invention;

Fig. 2 is an enlarged detail of the lower anchoring elements of the galvanometer structure illustrating particularly the novel features in accordance with this invention; and Fig. 3 is a detail illustrating the manner in which damping liquid is introduced into the structure.

Referring first to Fig. 1, the structure thereshown comprises a conventional galvanometer assembly consisting of a coil 10 wound about a pair of insulating spools 11—11 and mounted between an upper suspension filament or ribbon 12 and a lower suspension filament or ribbon 13, electrically connected to the opposite ends of the coil. This vibratory assembly is enclosed within the usual tubular barrel 14, commonly constructed of brass, and is suspended therein between upper and lower anchoring elements, respectively designated by the numerals 15 and 16, which firmly anchor the vibratory assembly to the upper and lower ends of galvanometer barrel 14. Upper suspension ribbon 12 carries the usual mirror 16, and a window 17 is mounted at an angle in an opening 18 in the side of the barrel opposite mirror 16. The barrel is installed vertically between a pair of magnet poles 19 and 20 in the usual manner and pole piece inserts 21 and 22 are mounted in barrel 14, opposite poles 19 and 20, to reduce the air gap and increase the sensitivity of galvanometer coil 10 in the well-known manner.

Lower anchoring member 16 includes an elongated stud 16a, constructed of a non-magnetic, electrically conducting metal, such as brass, having an intermediate section 23 thereof of downwardly tapering conical shape terminating in a threaded extension 24 of uniform diameter. The upper portion of the stud above conical section 23 is in the form of a hollow tubular sleeve 25, having an internal bore 26. A passageway 27 is drilled transversely through the body of the stud above conical section 23 and intersects bore 26 of the tubular sleeve 25 adjacent its lower end.

Anchoring stud 16a is attached to the galvanometer assembly by inserting lower suspension ribbon 13 into bore 26 of sleeve 25 and bringing the end thereof to the outside of the stud through one end of passageway 27, where it is soldered to the stud at 33 to form an electrical connection therewith, whereby the stud forms a terminal for the galvanometer. The quantity of solder employed is such as to seal the end of passageway 27. The other end of passageway 27 is similarly sealed with solder at 34. It will be understood that passageway 27 is provided in the form described primarily for ease in machining and assembly. For purposes of this invention, it is only necessary that any suitable means may be provided for fastening the lower end of suspension ribbon 13 to the body of the stud at a point adjacent the bottom of bore 26 so that when the vibratory element is placed under tension, it will be firmly anchored at its lower end and will be properly centered in bore 26 of sleeve 25.

With the arrangement described it will be seen that stud 16a and sleeve 25 become an integral part of the galvanometer assembly and form a unit therewith for installation in barrel 14. Sleeve 25 may now be filled with any suitable damping liquid, such as castor oil or preferably one of the newer liquid silicones, which are characterized by a high degree of temperature stability and high viscosity index, that is, relatively uniform viscosity under different temperatures. Filling of sleeve 25 with such a damping liquid may be effected in any suitable manner. Fig. 3 illustrates one way in which this may be conveniently accomplished. A hypodermic syringe S, filled with the damping liquid, and fitted with the usual hollow needle N is employed. The end of the needle is inserted in bore 26, temporarily pushing ribbon 13 to one side of the bore, as illustrated, the end of the needle being initially inserted to a point adjacent the bottom of the bore. The damping liquid is discharged into the bore as the needle is being withdrawn so that the bore will be completely filled by the time the needle is completely withdrawn therefrom. The galvanometer structure is then ready for installation in barrel 14. It will be understood that when the galvanometer assembly has been installed in the barrel and is under tension, suspension ribbon 13 will be substantially centered in sleeve 25. The length of sleeve 25 will normally be such as to enclose the major portion of suspension ribbon 13 and to thereby surround only that portion of the vibratory assembly with damping liquid. This is found to be sufficient to produce the degree of damping normally required for galvanometers of the class described.

With this arrangement, it will be noted that the lower end of sleeve 25 is sealed and only the upper end is open. It has been found that, by virtue of the capillary dimensions of bore 26, which normally is made only two-to-three thousandths of an inch in diameter, having its lower end sealed, when the suspension ribbon is in place, it becomes practically impossible to shake out any of the damping liquid. In fact, when such assembly has been completed and the damping liquid is in place, it has been found that the assembly may even be centrifuged at high speeds without the loss of any liquid from the open end of the sleeve. As a result, when the galvanometer assembly is completed, the galvanometers may be subjected to normal usage in the field without loss of the damping liquid and with retention of the full damping efficiency throughout the effective life of the galvanometer.

The galvanometer assembly, having stud 16a attached thereto with bore 26 filled with damping liquid as described, will then be placed in a suitable jig or fixture and all of the necessary tests and adjustments made thereon, preparatory to installation in barrel 14 in the manner described in my aforementioned Patent No. 2,439,576. Lower anchoring member 16 includes a tubular insulating bushing 28 adapted to surround conical section 23 of the stud and to be slidably insertable into the lower end of barrel 14. Bushing 28 is provided at its lower end with an outwardly extending annular shoulder 29 adapted to be received against the lower end of barrel 14. The upper portion of bushing 28 is provided with a conical bore 30 complementing the tapering surface of conical section 23 and communicating with a bore in the lower portion of bushing of uniform diameter adapted to slidably receive threaded extension 24 of the stud. A pair of lock nuts 31 and 32 are adapted to be screwed on the end of threaded extension 24 which extends through bushing 28, so that when the lock nuts are screwed on this extension, they will act to pull the stud downwardly through bushing 28 against the resistance of upper anchoring member 15, to which upper suspension ribbon will be attached when the galvanometer assembly is initially inserted in barrel 14, to produce the desired degree of tension in the galvanometer assembly. At the same time the downward movement of conical section 23 in bore 30 of the bushing will expand the latter into fluid-tight engagement with the wall of barrel 14, thereby forming a fluid-tight anchor for the lower end of the galvanometer assembly with the lower end of barrel 14.

When the assembled galvanometer structure is inserted in the magnet structure in the conventional manner, lock nut 32 is adapted to make electric contact in the usual manner with one of the galvanometer leads (not shown), the other or ground lead (also not shown) being electrically connected to barrel 14 in the usual way to complete the galvanometer circuit.

It will be understood that various alterations and changes may be made in the details of the embodiment herein described without departing from the scope of the appended claims but within the spirit of this invention.

What I claim and desire to secure by Letters Patent is:

1. A galvanometer, comprising, a cylindrical barrel, a vibratory element mounted therein, anchoring members connected to opposite ends of said vibratory element for anchoring same to opposite ends of said barrel, one of said anchoring members having a tubular extension enclosing a portion of said vibratory element, and a liquid damping medium contained wholly within said extension.

2. A galvanometer, comprising, a cylindrical barrel, a vibratory element mounted therein, anchoring members connected to opposite ends of said vibratory element for anchoring same to opposite ends of said barrel, one of said anchoring members having a tubular extension sealed at one end and enclosing a portion of said vibratory element, and a liquid damping medium contained wholly within said extension.

3. A galvanometer, comprising, a cylindrical barrel, a vibratory element comprising a coil suspended between a pair of suspension filaments mounted in said barrel, anchoring members connected to the outer ends of said filaments for anchoring said vibratory element to opposite ends of said barrel, the lower one of said anchoring members including an elongated stud having means carried thereby for locking it to the lower end of said barrel and having a tubular extension formed integrally therewith and enclosing the lower one of said filaments, the bore of said extension being of capillary dimensions, and a liquid damping medium contained wholly within said extension.

4. A galvanometer, comprising, a cylindrical barrel, a vibratory element comprising a coil suspended between a pair of suspension filaments mounted in said barrel, anchoring members connected to the outer ends of said filaments for anchoring said vibratory element to opposite ends of said barrel, the lower one of said anchoring members comprising an elongated stud having a hollow bore of capillary dimensions in its upper portion adapted to enclose the lower one of said filaments, a liquid damping medium contained wholly within said bore, and locking means adjustably engageable with the lower portion of said stud for locking the stud to the lower end of said barrel.

5. A galvanometer, comprising, a cylindrical barrel, a vibratory element comprising a coil suspended between a pair of suspension filaments mounted in said barrel, anchoring members connected to the outer ends of said filaments for anchoring said vibratory element to opposite ends of said barrel, the lower one of said anchoring members comprising an elongated stud having a hollow bore of capillary dimensions in its upper portion adapted to enclose the lower one of said filaments, a liquid damping medium contained wholly within said bore, and locking means adjustably engageable with the lower portion of said stud for locking the stud to the lower end of said barrel, said locking means including a lock nut adapted to be screwed on the lower end of said stud and an insulating bushing insertable in said barrel about the lower end of said stud and having an enlargement thereon adapted to be gripped between the end of said barrel and said nut.

6. A vibratory assembly for installation in a barrel type galvanometer, comprising, a coil, a pair of suspension filaments connected to opposite ends of said coil, and an anchoring member permanently connected to the outer end of one of said filaments, said anchoring member comprising an elongated stud having a hollow bore of capillary dimensions enclosing said one of said filaments, said bore having a closed bottom and adapted to contain a liquid medium for damping said vibratory element.

7. In a galvanometer of the barrel type including a vibratory element, an anchoring stud for anchoring an end of said vibratory element in the barrel, comprising, an elongated body connected to an end of said vibratory element and having in the inner end portion thereof a hollow bore of capillary dimensions enclosing a portion of said vibratory element and adapted to contain a liquid damping medium, the outer end portion of said body being adapted for anchoring connection to the adjacent end of said barrel.

8. A galvanometer, comprising, a cylindrical barrel, a vibratory element comprising a coil suspended between a pair of suspension filaments mounted in said barrel, anchoring members connected to the outer ends of said filaments for anchoring said vibratory element to opposite ends of said barrel, one of said anchoring members having a tubular extension enclosing a portion of its connected filament, and a liquid damping medium contained wholly within said extension.

9. A galvanometer, comprising, a cylindrical barrel, a vibratory element comprising a coil suspended between a pair of suspension filaments mounted in said barrel, anchoring members connected to the outer ends of said filaments for anchoring said vibratory element to opposite ends of said barrel, one of said anchoring members having a tubular extension enclosing a portion of its connected filament, said extension having a bore of capillary dimensions adapted to effectively retain therein a liquid damping medium by capillary attraction.

MARVIN E. MORROW.

REFERENCES CITED

The following references are of record in the file of this patent:

UNITED STATES PATENTS

| Number | Name | Date |
| --- | --- | --- |
| 2,137,188 | Whitman | Nov. 15, 1938 |
| 2,268,526 | Palmer | Dec. 30, 1941 |